(12) United States Patent
Kawai

(10) Patent No.: US 7,414,660 B2
(45) Date of Patent: Aug. 19, 2008

(54) LENS-INTERCHANGEABLE DIGITAL CAMERA SYSTEM

(75) Inventor: Sumio Kawai, Hachioji (JP)

(73) Assignee: Olympus Corporation, Tokyo (JP)

( * ) Notice: Subject to any disclaimer, the term of this patent is extended or adjusted under 35 U.S.C. 154(b) by 924 days.

(21) Appl. No.: 10/600,363

(22) Filed: Jun. 20, 2003

(65) Prior Publication Data

US 2004/0227845 A1   Nov. 18, 2004

(30) Foreign Application Priority Data

May 13, 2003   (JP) ............................. 2003-135005

(51) Int. Cl.
*H04N 5/225* (2006.01)
(52) U.S. Cl. ...................... 348/335; 348/374
(58) Field of Classification Search ................ 348/335, 348/340, 373, 374, 342; 396/71
See application file for complete search history.

(56) References Cited

U.S. PATENT DOCUMENTS

| | | | | |
|---|---|---|---|---|
| 5,499,069 | A * | 3/1996 | Griffith | 396/71 |
| 5,602,682 | A * | 2/1997 | Ito et al. | 359/737 |
| 6,157,781 | A * | 12/2000 | Konno et al. | 396/71 |
| 6,327,085 | B1 * | 12/2001 | Osawa et al. | 359/495 |
| 6,449,013 | B1 | 9/2002 | Suzuki et al. | |
| 6,583,819 | B2 * | 6/2003 | Ito et al. | 348/335 |
| 6,798,586 | B1 * | 9/2004 | Lyon et al. | 359/793 |
| 6,963,448 | B1 * | 11/2005 | Hayakawa | 359/494 |
| 7,193,651 | B2 * | 3/2007 | Kato | 348/349 |

FOREIGN PATENT DOCUMENTS

| | | |
|---|---|---|
| JP | 63239429 | 5/1988 |
| JP | 07-023404 | 1/1995 |
| JP | 07123421 | 5/1995 |
| JP | 2000-101886 | 4/2000 |
| JP | 2002-214415 | 8/2000 |
| JP | 2000244821 | 9/2000 |
| JP | 3370440 | 11/2002 |

* cited by examiner

*Primary Examiner*—Justin P Misleh
(74) *Attorney, Agent, or Firm*—Volpe and Koenig, P.C.

(57) ABSTRACT

The present digital camera system includes interchangeable lens barrels, and a digital camera having a first camera body to which the interchangeable lens barrel can be attached or another digital camera having a second camera body. The first camera body contains a first image pickup element having a reference pixel pitch and a first optical LPF (low pass filter). The second camera body contains a second image pickup element having a pixel pitch different from the reference pixel pitch, a second optical LPF and a compensating optical element. The compensating optical element is a glass plate having no double refraction characteristic for compensating an amount of the change in optical path length due to the decrease in thickness of the second optical LPF with respect to the first optical LPF. The present digital camera system allows the replacement of an interchangeable lens without generating various kinds of aberration among camera bodies having different pixel pitches.

24 Claims, 10 Drawing Sheets

LENS-INTERCHANGEABLE DIGITAL CAMERA SYSTEM

This application claims benefits of Japanese Application No. 2003-135005 filed in Japan on May 13, 2003, the contents of which are incorporated by this reference.

BACKGROUND OF THE INVENTION

1. Field of the Invention

The present invention relates to a lens-interchangeable digital camera system and a digital camera, interchangeable lens and camera body thereof.

2. Related Art Statement

A conventional digital camera includes an optical low-pass filter (called optical LPF hereinafter), containing crystal or the like having a double refraction characteristic, in the front of the surface of an image pickup element in order to reduce false color (such as moiré) of a high frequency component of a shot image. A single lens reflex digital camera system has been provided in which a lens (lens barrel) is interchangeable with respect to the camera body. Image pickup elements having different numbers of pixels, that is, having different pixel pitches are built in multiple bodies of the lens-interchangeable digital camera system. Furthermore, multiple kinds of interchangeable lens can be attached to the body.

An optical LPF having thickness corresponding to the pixel pitches is provided in the front of the surface of the image pickup element having different pixel pitches as described above in the single lens reflex camera body.

The thickness of the optical LPF is set in accordance with the pixel pitch of the image pickup element as described above because a luminous flux having passed through the optical LPF is divided into non-refractive normal light and abnormal light (double refractive) and the divided luminous fluxes must be launched into adjacent pixels of the image pickup element in order to prevent the occurrence of the moiré. Therefore, the thickness of the optical LPF must be changed in accordance with the pixel pitch.

For example, Japanese Patent Application Publication No. Hei 7-123421 and No. 2000-244821 and Japanese Patent Publication No. 2552855, which will be described later as Patent Document 1, Patent Document 2 and Patent Document 3, respectively, discloses propositions relating to optical path length control and/or spatial frequency characteristic control by operating an optical LPF in a conventional digital camera.

An image pickup apparatus disclosed in Patent Document 1 has a switching circuit for switching a first image pickup mode and a second image pickup mode. In the first image pickup mode, color natural image signals are generated by using electric signals output from an image pickup element. In the second image pickup mode, high resolution image signals are generated for a single colored or monotonous image. An optical LPF is retractable in accordance with the switching, and the change in optical path length is corrected by using another optical system. With the image pickup apparatus, high resolution image signals can be generated for a monotonous image.

An image pickup apparatus disclosed in Patent Document 2 drives switching of a dummy glass for optical length correction and an optical LPF corresponding to driving modes of an image pickup element. The dummy glass for optical path length correction and the optical LPF constitute an LPF block. With the image pickup apparatus, the occurrence of pseudo signals caused by changes in spatial sampling characteristic due to special driving of the image pickup element can be effectively suppressed.

In an image pickup apparatus disclosed in Patent Document 3, when a frame reading mode is selected, correction optical means, instead of an optical low pass filter, is inserted to an incident optical path onto an image pickup means. The correction optical means has the same optical length as that of the optical LPF. With the image pickup apparatus, aliasing does not occur even when the vertical scan frequency for sampling is changed from 525 to 262.5. Therefore, the deterioration in image quality does not occur.

Some single lens reflex digital camera system may apply LN element ($LiNbO_3$) as an optical LPF, instead of crystal. The LN element is extremely thin and has the same double refraction characteristic as that of crystal. In order not to significantly change pixel pitches in every camera body of the digital camera system, the size of the image pickup element may be changed so as to change the number of pixels. When the LN element is applied, the optical path length of the luminous flux does not significantly change since the LN element is thin. Therefore, an interchangeable lens can be interchanged between digital camera bodies having different pixel pitches.

SUMMARY OF THE INVENTION

One lens-interchangeable digital camera system according to the invention comprises: a first camera body including a first optical element having a predetermined function; an interchangeable lens compliant with the first camera body, having an optical characteristic designed for correcting aberration for the first camera body; and a second camera body to which the interchangeable lens can be attached, having the same function as that of the first optical element and including a second optical element thinner than the first optical element and a compensating optical system for correcting a difference in thickness between the first optical element and the second optical element.

One camera body according to the invention is a camera body to which an interchangeable lens optically designed for a reference body can be removably attached, the camera body including an interchangeable lens mount portion, an image pickup element, and a compensating optical system arranged between the mount portion and the image pickup element such that the optical path length between the interchangeable lens mount portion and the image pickup element can be equal to that of the reference camera body.

One interchangeable lens according to the invention is an interchangeable lens removably attached to multiple camera bodies, including a lens side mount portion for engaging with a mount portion of the camera body, and a photographic optical system for optimizing aberration on the image pickup surface of the camera body having the thickest optical element in the multiple camera bodies.

One reference camera body according to the invention is one of multiple camera bodies to which an interchangeable lens can be attached and is a reference for the interchangeable lens. The reference camera body includes an interchangeable lens mount portion for attaching the interchangeable lens, an image pickup element, and an optical element provided between the interchangeable lens mount portion and an image pickup surface of an image pickup element. The optical element has a predetermined function. Aberration on the image pickup surface of the image pickup element is optimized by a combination of the optical element and the interchangeable lens.

The other features and benefits of the invention will be apparent from the description below.

BRIEF OF DESCRIPTION OF THE DRAWINGS

Figure 9:
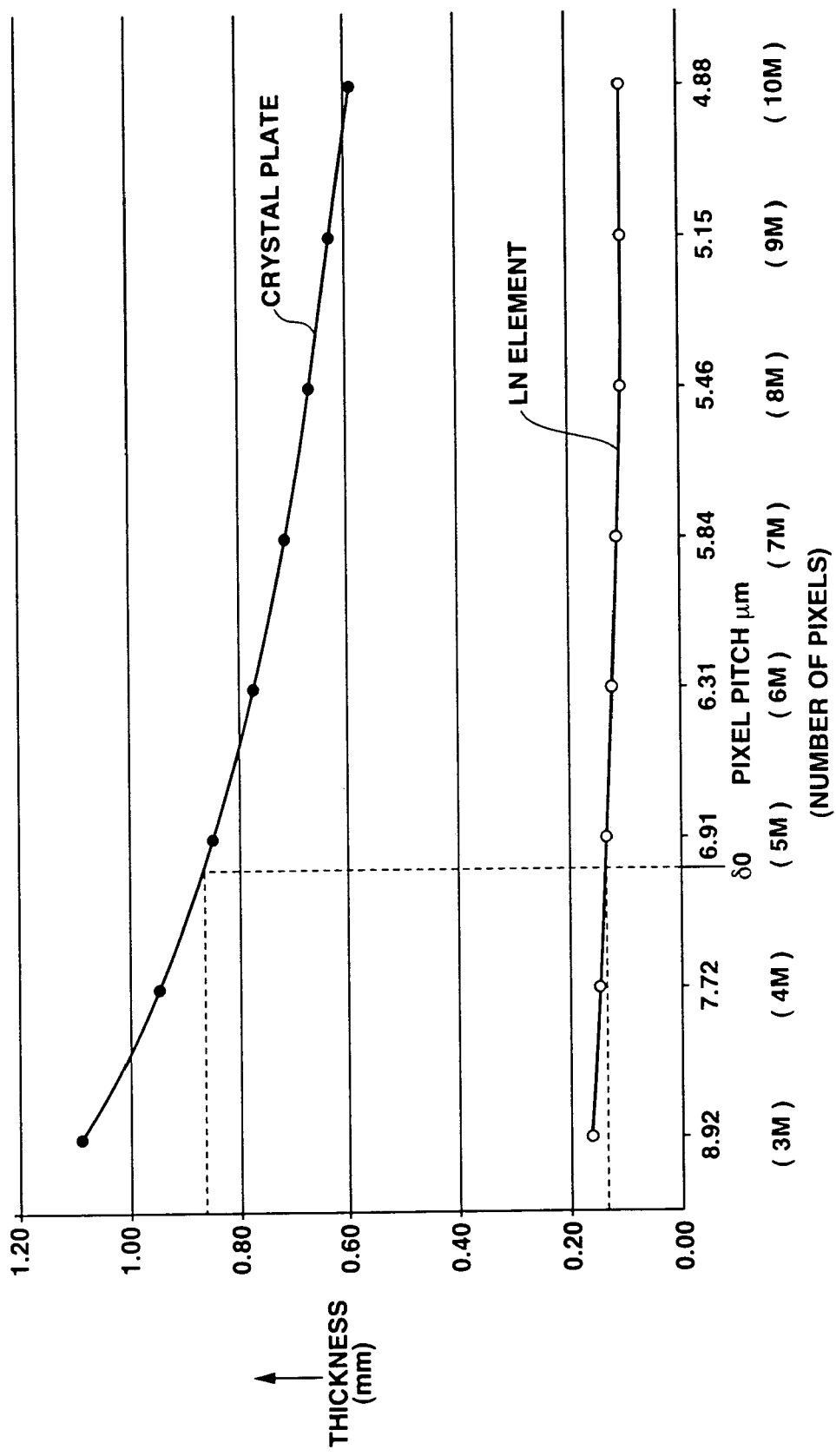
Figure 10:
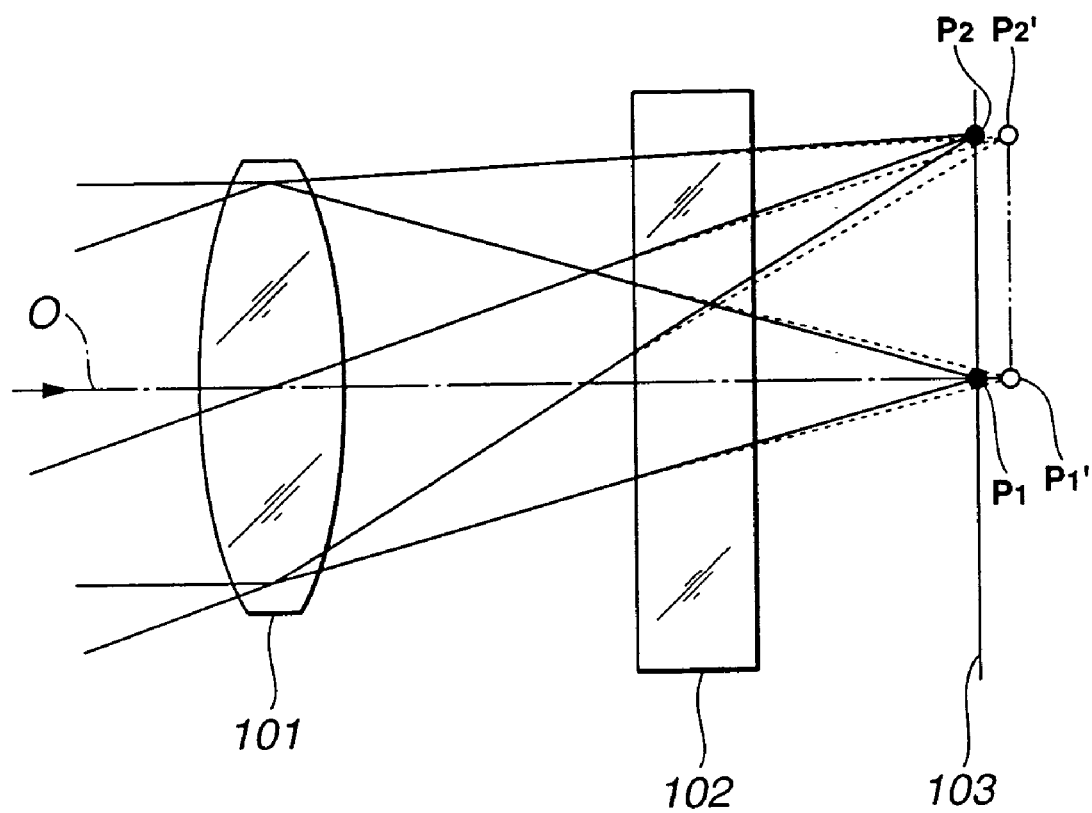

FIG. 9 is a graph showing a relationship between pixel pitches of an image pickup element or numbers of pixels of an image pickup element to be applied to a digital camera and thicknesses of an optical LPF (for crystal and an LN element) applied thereto; and FIG. 10 is an optical path diagram showing a state of the change in an image-forming position depending on the presence or absence of an optical filter in the front of the surface of an image pickup element in a conventional image pickup optical system.

DETAIL DESCRIPTION OF THE PREFERRED EMBODIMENTS

Embodiments of the present invention will be described below with reference to drawings.

Prior to the description of the embodiments of the invention, optical influences of the thickness of an optical LPF in the front of the surface of an image pickup element will be described. For example, when optical LPFs having different thicknesses are provided in the front of the surface of an image pickup element, the image-forming position changes. FIG. 10 is an optical path diagram showing a state where an image-forming position changes based on the presence or absence of an optical LPF in the front of the surface of an image pickup element.

When an optical LPF 102 is not provided in front of an image pickup surface 103 of an image pickup element as shown in FIG. 10, the center luminous flux having passed through a lens 101 forms an image at a point P1 on the image pickup surface 103.

A peripheral luminous flux having passed through the lens 101 forms an image at a point P2 on the image pickup surface 103. However, when the optical LPF 102 is provided in front of the image pickup surface 103 of the image pickup element, the center luminous flux having passed through the lens 101 forms an image at a point P1' behind the image pickup surface 103. The peripheral luminous flux having passed through the lens 101 form an image at a point P2' behind the image pickup surface 103. When the LPF 102 is thicker, the luminous flux forms an image in a more rear direction. In other words, the effective optical path length of a luminous flux to the image-forming position depends on the thickness of the optical LPF.

On the other hand, the optical length generally differs between a luminous flux incident on the center of the photographic screen and a luminous flux incident on the periphery of the photographic screen in a photographic optical system of a digital camera, generating a field curvature aberration as a result. The difference in optical path length of the center and periphery of the photographic screen can be corrected by providing the photographic optical system with an optical characteristic for canceling the curvature of field to correct the curvature of field as a result.

However, when the principle of the aberration correction is applied to a lens-interchangeable, single-lens reflex digital camera, problems as follows may occur. That is to say, in a single-lens reflex digital camera system including a first camera body having a first optical LPF and an interchangeable lens designed for the first camera body, when the interchangeable lens is attached to a second camera body having a second optical LPF, and when the thicknesses of the first and second optical LPFs differ, a problem that the curvature-of-field aberration cannot be corrected properly occurs. This problem occurs when the first and second camera bodies include image pickup elements having different pixel pitches, the thicknesses of the optical LPFs are set so as to be compliant with the pixel pitches, respectively, as described above.

Figure 1A:
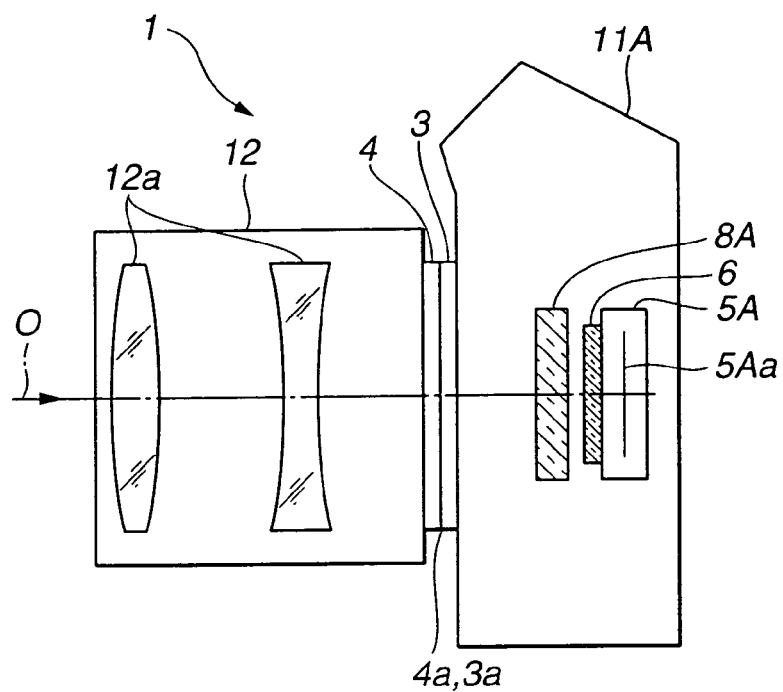
FIG. 1A shows an arrangement of a combination of a camera body and interchangeable lens, an optical member and an image pickup element in a digital camera system according to a first embodiment of the invention and shows a combination of a reference camera body and an interchangeable lens.
Figure 1B:
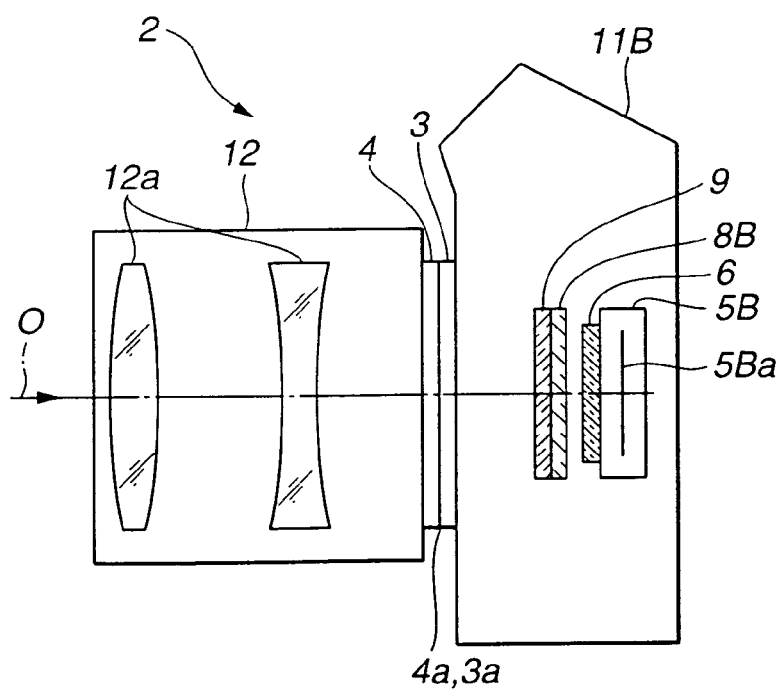
FIG. 1B shows an arrangement of a combination of a camera body and interchangeable lens, an optical member and an image pickup element in the digital camera system in FIG. 1A and shows a combination of a non-reference camera body and an interchangeable lens.

Next, prior to the detail description of the digital camera system according to the first embodiment of the invention, the outline will be described with reference to FIGS. 1A and 1B. FIGS. 1A and 1B are diagrams each showing an arrangement of a combination of a camera body and interchangeable lens, a filter optical member and an image pickup element in a digital camera system according to a first embodiment of the invention. FIG. 1A shows a combination of a reference camera body and an interchangeable lens. FIG. 1B shows a combination of a non-reference camera body and an interchangeable lens.

A digital camera system according to this embodiment has a digital camera 1 and a digital camera 2 shown in FIGS. 1A and 1B.

The digital camera 1 includes a first camera body 11A and an interchangeable lens barrel 12. The first camera body 11A is a reference camera body. The interchangeable lens barrel 12 is a removable interchangeable lens.

The digital camera 2 includes a second camera body 11B and the interchangeable lens barrel 12. The second camera body 11B is a non-reference camera body. The interchangeable lens barrel 12 serves as a removable interchangeable lens having the same specification as the one attached to the first camera body 11A.

The first camera body 11A contains an image pickup element 5A and an optical LPF 8A and has a camera side mount portion 3. The image pickup element 5A is a first image pickup element constituted by a CCD (or a CMOS type image pickup element) and the like having a protection glass 6. The optical LPF 8A is a first optical low-pass filter, which is an optical element arranged in the front of the surface of the image pickup element. The camera side mount portion 3 has a camera-side mount surface 3$a$ abuttable to a lens side mount surface 4$a$. In other words, when both of them are fixed by engaging the lens side mount portion 4 and the camera side mount portion 3, the position in an optical axis direction is fixed when the lens side mount surface 4$a$ and the camera side mount surface 3$a$ abut to each other.

For example, the image pickup element 5A is a 4/3 type image pickup element and has a predetermined reference pixel pitch $\delta 0$ (corresponding to a reference number of pixels $\delta 0$) (see FIG. 9 described later). The predetermined reference pixel pitch $\delta 0$ is a first pixel pitch. A subject image formed on an optoelectronic converting surface 5A$a$, which is an image-forming surface of the image pickup element, is converted to electric image pickup signals.

In order to prevent the occurrence of moiré, the optical LPF 8A contains crystal having a double refraction characteristic in thickness corresponding to the reference pixel pitch $\delta 0$ of the image pickup element 5A and includes an infrared absorbing glass. Furthermore, the optical LPF 8A has a predetermined refractive index, which is substantially the same as that of glass.

The optical LPF 8A is arranged between the camera side mount portion 3 and the image pickup element 5A and the thickness of the optical LPF 8A is thickest among that of the optical LPF 8A, that of an optical LPF 8B of the second camera body, which will be described later, and that of an optical LPF applied in another non-reference camera body to which the same interchangeable lens barrel 12 can be removably attached.

The interchangeable lens barrel 12 has a lens side mount portion 4 including a lens side mount surface 4$a$ abuttable to a first camera body side or a second camera body side mount surface 3$a$. The interchangeable lens barrel 12 contains a photographic optical system 12$a$ including multiple photographic lenses. The interchangeable lens barrel 12 has an identical specification and can be removably attached to both of the first camera body 11A and the second camera body 11B. For example, the interchangeable lens barrel 12 may be one of multiple interchangeable lenses such as an interchangeable lens having different focal distances, a zoom lens and a macro lens.

When the interchangeable lens barrel 12 is attached to the reference camera body 11A, a subject luminous flux from the photographic optical system 12$a$ pass through the optical LPF 8A and form an image on the image pickup surface 5A$a$ of the image pickup element 5A. In this case, the photographic optical system 12$a$ is designed and produced so as to form an image on the image pickup surface 5A$a$ without the curvature-of-field aberration, with the optical path length being changed (effective change in optical path length) in accordance with the refractive index and thickness of the optical LPF 8A. In other words, both of the image-formed point P1' by the center luminous flux and the image-formed point P2' by a peripheral luminous flux shown in FIG. 10 do not have the curvature-of-field aberration on the image pickup surface 5A$a$ of the image pickup element 5A.

The second camera body 11B contains an image pickup element 5B, an optical LPF 8B and a compensating optical element 9, and has the camera side mount portion 3. The image pickup element 5B is a second image pickup element constituted by a CCD (MOS type image pickup element) having a protection glass 6 and the like. The optical LPF 8B is a second optical low-pass filter arranged in the front of the surface of the image pickup element. The compensating optical element 9 is a compensating optical system. The camera side mount portion 3 is common to the first camera body 11A and has a camera side mount surface 3$a$, which can be engaged with the lens side mount surface 4$a$.

The image pickup element 5B is a 4/3 type image pickup element similar to the reference image pickup element 5A but has a pixel pitch $\delta 1$, which is a second pixel pitch and is different from the reference pixel pitch $\delta 0$. A subject image formed on a photoelectric conversion surface 5B$a$ is converted to electric image pickup signals as well. The photoelectric conversion surface 5B$a$ is an image-forming surface of the image pickup element 5B.

The optical LPF 8B is a filter thinner than the optical LPF 8A and contains crystal or an LN element having a double refraction characteristic and having a thickness corresponding to the pixel pitch $\delta 1$ of the image pickup element 5B and further contains infrared absorbing glass. The optical LPF 8B has substantially the same predetermined refractive index as of glass. The optical LPF 8B is also disposed between the lens mount portion 3 and the image pickup element 5B.

The compensating optical element 9 is an optical member constituted by glass and the like, which does not have a double refractive characteristic but has substantially the same refractive index as of the optical LPF 8A. The compensating optical element 9 is attached and built in the second optical LPF 8B so that the image-forming position of a subject luminous flux by the interchangeable lens barrel 12 does not displace from the photoelectric conversion surface 5B$a$ of the image pickup element 5B. Furthermore, the aberration including the curvature-of-field aberration does not occur. In other words, the compensating optical element 9 compensates changes in optical path length due to the optical LPF 8B which becomes thinner in the first camera body 11A. The compensating optical element 9 is set such that the sum of the thickness of the compensating optical element 9 and optical LPF 8B is substantially the same as the thickness of the optical LPF 8A.

In the digital camera system according to this embodiment having the above-described construction, the interchangeable lens barrel 12 can be attached to the reference first camera body 11A. The first camera body 11 contains the image pickup element 5A having the predetermined reference pixel pitch $\delta 0$. A subject luminous flux from an interchangeable lens are double refracted by the optical LPF 8A and form an image properly on the image converting surface 5A$a$ of the image pickup element 5A without a curvature-of-field aberration.

The interchangeable lens barrel 12 can be attached to the non-reference second camera body 11B. The second camera body 11B contains the image pickup element 5B having a pixel pitch $\delta 1$. A subject luminous flux from an interchangeable lens passes through the compensating optical element 9, is double refracted by the optical LPF 8B, and forms an image on the image pickup conversion surface 5B$a$ of the image pickup element 5B. The amount of the change in effective optical path length due to the thin optical LPF 8B is compensated by inserting the compensating optical element 9. The subject luminous flux forms an image properly without the curvature-of-field aberration similarly on the image pickup conversion surface 5B$a$ of the image pickup element 5B.

Next, internal constructions of the digital cameras 1 and 2 in the digital camera system according to this embodiment will be described with reference to FIGS. 2 and 3.

Figure 2:
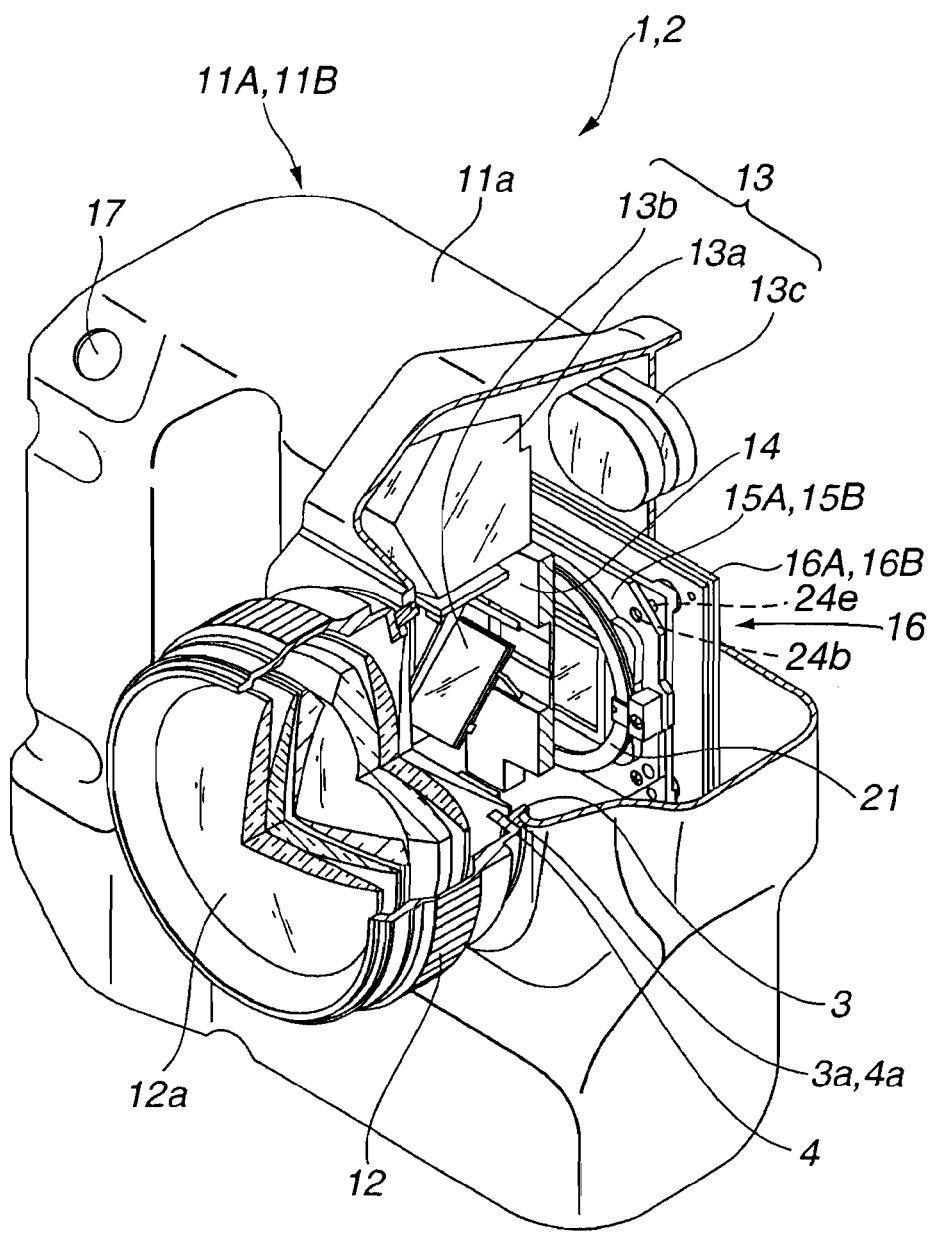
FIG. 2 is a perspective diagram (including a partial cut-out) showing an internal construction of a camera body having an interchangeable lens barrel in the digital camera according to this embodiment shown in FIGS. 1A and 1B.
Figure 3:
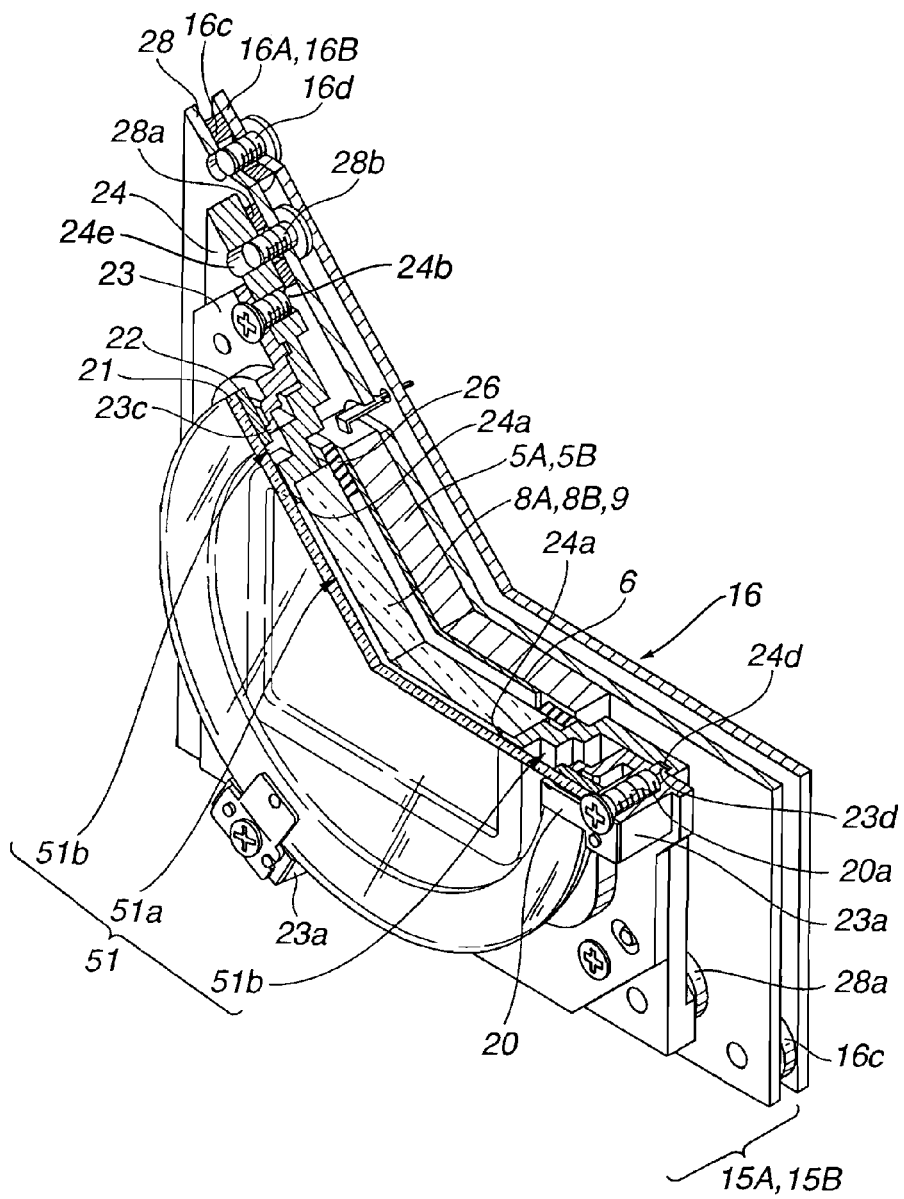
FIG. 3 is a perspective diagram (including a partial cut-out) showing an internal construction relating to an image pickup unit of the digital camera according to this embodiment shown in FIGS. 1A and 1B.

FIG. 2 is a perspective diagram (including a partial cut-out) showing an internal construction of the digital camera in which an interchangeable lens barrel is attached to the camera body. FIG. 3 is a perspective diagram (including a partial cut-out surface) showing an internal construction relating to an image pickup unit of the digital camera.

Each of the digital cameras 1 and 2 has an interchangeable lens barrel 12 having a common specification, and a first camera body 11A or a second camera body 11B. The first camera body 11A is a reference camera body to which the interchangeable lens barrel 12 can be removably attached. The second camera body 11B is a non-reference camera body. The mount surface 4a of the interchangeable lens side mount portion 4 and the mount surface 3a of the camera body side mount portion 3 are abutted to each other such that the interchangeable lens barrel 12 is mounted.

The first camera body 11A and the second camera body 11B have a common construction except for the image pickup element of the image pickup unit and the optical LPF, which are to be contained.

The interchangeable lens barrel 12 holds the photographic optical system 12a inside. The photographic optical system 12a includes multiple lenses and a driving mechanism for the multiple lenses. The photographic optical system 12a comprises multiple optical lenses, for example, such that a luminous flux from a subject can pass through the multiple optical lenses and forms an image on a predetermined position (on the photoelectric conversion surface of the image pickup element 5A or 5B in FIG. 3) without different kinds of optical aberration such as the curvature-of-field aberration. In other words, the photographic optical system 12a is designed to eliminate the curvature-of-field aberration in an optical LPF in the front of the surface of an image pickup element.

The "state without aberration" includes a state of a certain level of aberration or below, which does not influence on practical uses. In other words, the photographic optical system 12a is designed such that various kinds of aberration can be optimized in consideration of, for example, an optical LPF in the front of the surface of the image pickup element.

Each of the camera bodies 11A and 11B is a so-called "single-lens reflex type" camera body and includes various components within a body portion 11a. Each of the camera bodies 11A and 11B further includes a body side mount portion 3 on the front surface such that the lens barrel 12 holding the photographic optical system 12a can be removably attached thereto. In other words, the camera body portion 11a has an exposure opening at the substantially center on the front surface side of the camera body portion 11a. The exposure opening has a predetermined bore for guiding subject luminous fluxes into the camera body portion 11a.

Detail internal constructions of the camera bodies 11A and 11B of the first and second digital cameras will be described below. First of all, various operation members, such as a release button 17, for operating the camera body portion 11a is provided at a predetermined position on the top surface or back surface of the camera body portion 11a. The release button 17 is used for generating instruction signals to start a photographic operation.

The camera body portion 11a includes and arranges various components at predetermined positions, as shown in FIG. 2, comprising a finder device 13, a shutter portion 14, an image pickup unit 15A (for the first camera body) or 15B (for the second camera body), multiple circuit substrates including main circuit substrate 16A (for the first camera body) or 16B (for the second camera body) and the like. The finder device 13 is provided for forming a desired subject image by the photographic optical system 12a, for example, on a predetermined position different from the photoelectric conversion surface of the image pickup elements 5A and 5B. The finder device 13 constitutes a so-called "observation optical system". The shutter potion 14 includes a shutter mechanism, for controlling the time for irradiating a subject luminous flux to the photoelectric conversion surface of the image pickup element 5A or 5B. The image pickup unit 15A or 15B includes an image pickup element for obtaining subject image signals based on the subject luminous flux having passed through the photographic optical system 12a. Various electric members of electric circuits are implemented on the main circuit substrate 16A or 16B. The electric circuits includes an image signal processing circuit for performing various kinds of signal processing on image signals obtained by the image pickup element 5A or 5B.

A dust-preventive filter 21 is provided in the front of the surface of each of the image pickup units 15A and 15B. The dust-preventive filter 21 prevents the deposition of dust to the photoelectric conversion surface of an image pickup element.

The finder device 13 includes a reflector 13b, a pentaprism 13a and an eyepiece 13c. The reflector 13b is arranged to bend an optical axis of a subject luminous flux having passed through the photographic optical system 12a and to guide the subject luminous flux to the observation optical system side. The pentaprism 13a receives a luminous flux emitted from the reflector 13b and forms an erect image thereof. The eyepiece 13c is used for enlarging and observing a subject image.

The reflector 13b is freely movably arranged between a position evacuated from the optical axis of the photographic optical system 12a and a predetermined position on the optical axis. The reflector 13b is normally disposed at a predetermined angle, such as 45E, on the optical axis of the photographic optical system 12a with respect to the optical axis. Thus, when the camera 1 is at the normal state, a subject luminous flux having passed through the photographic optical system 12a are bent by the reflector 13b and are refracted toward the pentaprism 13a above the reflector 13b.

On the other hand, while the camera 1 is performing a photographic operation and during the real exposure operation, the reflector 13b can move to a predetermined position where the reflector 13b evacuates from the optical path of the photographic optical system 12a. Thus, the subject luminous flux is guided to the image pickup element side and illuminates the photoelectric conversion surface.

The shutter portion 14 is similar to those generally used in a conventional camera or the like, such as a focal plane type shutter mechanism and a driving circuit for controlling operations of the shutter mechanism.

The image pickup units 15A and 15B for the first and second camera bodies, respectively, have substantially the same construction except for the contained image pickup elements and optical LPFs. First of all, the image pickup unit 15A for the first camera body will be described.

The image pickup unit 15A includes the image pickup element 5A, an image pickup element fixing plate 28, the optical LPF 8A, a low-pass filter receiving member 26, an image pickup element storage case member 24 (called CCD case 24 hereinafter), a dust-preventive filter receiving member 23, a dust-preventive filter 21, a piezoelectric element 22 and a press member 20. The image pickup element 5A is constituted by a CCD and the like for obtaining image signals corresponding to the light irradiated onto the photoelectric conversion surface of the image pickup element 5A through the photographic optical system 12a. The image pickup element fixing plate 28 is constituted by a thin-plate like member for fixing and supporting the image pickup element 5A. The optical LPF 8A is an optical element in the front of the photoelectric conversion surface of the image pickup element 5A, for removing high frequency components from a subject luminous flux irradiated through the photographic optical system 12a. The low-pass filter receiving member 26 is constituted by an elastic member substantially in a frame shape and is provided on the periphery between the optical LPF 8A and the image pickup element 5A. The CCD case 24 stores, fixes and holds the image pickup element 5A and supports the optical LPF 8A by closely abutting to the periphery and the vicinity. A predetermined position of the CCD case 24 is closely in contact with the dust-preventive filter receiving member 23. The dust-preventive filter receiving member 23 is provided in the front of the surface side of the CCD case 24 and is closely in contact with the periphery or the vicinity. The dust-preventive filter 21 is a dust-preventive member supported by the dust-preventive filter receiving member 23 and faces toward the optical LPF 8A at a position spaced apart from the optical LPF 8A by a predetermined distance in the front of the surface side of the optical LPF 8A in the front of the photoelectric conversion surface side of the image pickup element 5A. The piezoelectric element 22 is provided on the periphery of the dust-preventive filter 21 and removes dust by giving a predetermined amount of vibration to the dust-preventive filter 21. The press member 20 is constituted by an elastic body for connecting, fixing and holding the dust-preventive filter 21 to the dust-preventive filter receiving member 23 in an air-tight manner.

The image pickup element 5A performs photoelectric conversion processing on subject luminous fluxes received by the photoelectric conversion surface 5Aa (FIG. 1A) of the image pickup element 5A through the photographic optical system 12a. Thus, the image pickup element 5A can obtain image signals corresponding to the subject image on the photoelectric conversion surface. The image pickup element 5A may be a 4/3 type charge-coupled device. In this case, the reference pixel pitch δ0, which is a first pixel pitch, is substantially 7 µm, for example.

The image pickup element 5A is implemented at a predetermined position on the main circuit substrate 16A through the image pickup element fixing plate 28. An image signal processing circuit and work memory, not shown, are implemented together on the main circuit substrate 16. Thus, output signals from the image pickup element 5A, that is, image signals obtained through photoelectric conversion processing are transmitted to the image signal processing circuit.

The protection glass 6 (FIG. 3) is attached in front of the photoelectric conversion surface of the image pickup element 5A.

The signal processing performed in the image signal processing circuit includes various kinds of signal processing such as processing for converting image signals obtained from the image pickup element 5A to signals suitable for recording. In this case, the image signals correspond to the image formed on the photoelectric conversion surface of the image pickup element 5A by the photographic optical system 12a held within the lens barrel 12 attached to the body side mount portion 3. These kinds of signal processing are the same as processing normally performed in a general digital camera for handling electronic image signals.

The optical LPF 8A is provided in the front of the surface side of the image pickup element 5A via the low-pass filter receiving member 26. The optical LPF 8A contains crystal, which is an optical element having a double refraction characteristic. As described later, the optical LPF 8A has a thickness t1 corresponding to a pixel pitch (about 7 µm) of the image pickup element 5A. The optical LPF 8A further contains an infrared absorbing glass, as described later.

The CCD case 24 is arranged in such a way to cover the optical LPF 8A. The CCD case 24 has a rectangular opening substantially at the center. The optical LPF 8A and image pickup element 5A are provided in the opening from the back. A step 24a having a substantially L-shaped section is provided on the internal periphery on the back side of the opening.

As described above, the low-pass filter receiving member 26 constituted by an elastic member is provided between the optical LPF 8A and the image pickup element 5A. The low-pass filter receiving member 26 is provided at a position avoiding an effective range of the photoelectric conversion surface on the periphery of the front surface side of the image pickup element 5A. Furthermore, the low-pass filter receiving member 26 is abutted to the vicinity of the periphery of the back side of the optical LPF 8A. The optical LPF 8A and the image pickup element 5A are in contact with each other substantially in an air-tight manner. Thus, elastic force toward the optical axis by the low-pass filter receiving member 26 acts on the optical LPF 8A.

Then, the periphery of the front surface side of the optical LPF 8A is disposed so as to be in contact with the step 24a of the CCD case 24 substantially in an air-tight manner. Thus, the position in the optical axis direction of the optical LPF 8A is controlled against the elastic force by the low-pass filter receiving member 26 for attempting to move the optical LPF 8A toward the optical axis.

In other words, the optical LPF 8A laid within the opening of the CCD case 24 from the back surface side is positionally controlled by the step 24a in the optical axis direction. Thus, the optical LPF 8A is prevented from coming out from the inside of the CCD case 24 toward the front surface side.

In this way, after the optical LPF 8A is inserted from the back surface side into the opening of the CCD case 24, the image pickup element 5A is disposed on the back surface side of the optical LPF 8A. In this case, the low-pass filter receiving member 26 is held at the periphery between the optical LPF 8A and the image pickup element 5A.

As described above, the image pickup element 5A is implemented on the main circuit substrate 16 via the image pickup element fixing plate 28. The image pickup element fixing plate 28 is fixed via a spacer 28a with a screw 28b into a screw hole 24e from the back surface side of the CCD case 24. The main circuit substrate 16 is fixed to the image pickup element fixing plate 28 with a screw 16d via a spacer 16c.

The dust-preventive filter receiving member 23 is fixed to the screw hole 24b of the CCD case 24 on the front surface side of the CCD case 24 with a screw 23b. A peripheral slot 24d in a substantially ring shape is provided at a predetermined position on the front surface side on the periphery side of the CCD case 24. On the other hand, a ring-shape projection 23d to fit to the peripheral slot 24d of the CCD case 24 is provided in a substantially-ring form at a predetermined position on the back surface side of the periphery side of the dust-preventive filter receiving member 23. Therefore, when the ring-shape projection 23d fits into the peripheral slot 24d, the CCD case 24 and the dust-preventive filter receiving member 23 fit into each other substantially in an air-tight manner in a ring-shaped area, that is, in an area having the peripheral slot 24d and the ring-shaped projection 23d.

The dust-preventive filter 21 contains glass and has a circular or polygonal plate as a whole. An area extending, with some extent, at least from the center of the dust-preventive filter 21 to the edge is transparent. The transparent area faces toward the front surface side of the optical LPF 8A through a predetermined space.

The piezoelectric element 22 is bonded on the periphery of one surface of the dust-preventive filter 21 with adhesive means, for example, such that the piezoelectric element 22 is integrated to the periphery. The piezoelectric element 22 is a predetermined vibrating member for giving vibrations to the dust-preventive filter 21 and includes an electromechanical conversion element and the like. The piezoelectric element 22 can cause a predetermined amount of vibration in the dust-preventive filter 21 by externally applying a predetermined amount of driving voltage.

The dust-preventive filter 21 is fixed and is held by the press member 20 such that the dust-preventive filter 21 can be engaged with the dust-preventive filter receiving member 23 in an air-tight manner. The press member 20 is constituted by an elastic body such as a flat spring.

The dust-preventive filter receiving member 23 has a circular or polygonal opening in the vicinity of the substantially center of the dust-preventive filter receiving member 23. The opening is designed to be large enough for subject luminous fluxes through the photographic optical system 12a to illuminate the photoelectric conversion surface of the image pickup element 5A at the back.

A wall 23e in a substantially ring shape extends forward from the periphery of the opening. A receiver 23c extends toward the front surface from the distal end of the wall 23e.

On the other hand, multiple (three, in this embodiment) projecting portions 23a extend forward from predetermined positions on the external periphery of the front surface side of the dust-preventive filter receiving member 23. Each of the projecting portions 23a can fix the press member 20 for fixing and holding the dust-preventive filter 21. The press member 20 is fixed to the end of the projecting portion 23a with fastening means such as a screw 20a.

The press member 20 includes an elastic body such as a flat spring, as described above. The proximal end of the press member 20 is fixed to the projecting portion 23a, and the free end is abutted to the external periphery of the dust-preventive filter 21. Thus, the dust-preventive filter 21 is pressed toward the dust-preventive filter receiving member 23 side, that is, toward the optical axis.

In this case, a predetermined position of the piezoelectric element 22 on the external periphery of the back surface side of the dust-preventive filter 21 is abutted to the receiver 23c. Thus, the positions of the dust-preventive filter 21 and piezoelectric element 22 in the optical axis direction can be controlled. Then, the dust-preventive filter 21 is fixed and is held so as to engage with the dust-preventive filter receiving member 23 in an air tight manner via the piezoelectric element 22.

In other words, the dust-preventive filter receiving member 23 is forced by the press member 20 to engage with the dust-preventive filter 21 through the piezoelectric element 22 in an air-tight manner.

By the way, as described above, the peripheral slot 24d and ring-shaped projection 23d of the dust-preventive filter receiving member 23 and the CCD case 24 fit into each other substantially in an air-tight manner. At the same time, the dust-preventive filter receiving member 23 and the dust-preventive filter 21 are forced by the press member 20 to engage with each other in an air-tight manner via the piezoelectric element 22. The optical LPF 8A in the CCD case 24 is provided substantially in an air-tight manner between the periphery of the front surface side of the optical LPF 8A and the step 24a of the CCD case 24. Furthermore, the image pickup element 5A is provided on the back surface side of the optical LPF 8A via the low pass filter receiving member 26. The substantial air-tightness is also held between the optical LPF 8A and the image pickup element 5A.

Therefore, a predetermined gap 51a is provided in a space between the optical LPF 8A and the dust-preventive filter 21. The periphery side of the optical LPF 8A, that is, the CCD case 24, the dust-preventive filter receiving member 23 and the dust-preventive filter 21 form a space 51b. The space 51b is a sealed space extending toward the outside of the optical LPF 8A.

The space 51b is set to be larger than the gap 51a. A sealed space 51 includes the gap 51a and the space 51b. The space 51 is formed by the CCD case 24, the dust-preventive filter receiving member 23, the dust-preventive filter 21 and the optical LPF 8A substantially in an air-tight manner, as described above.

Figure 4:
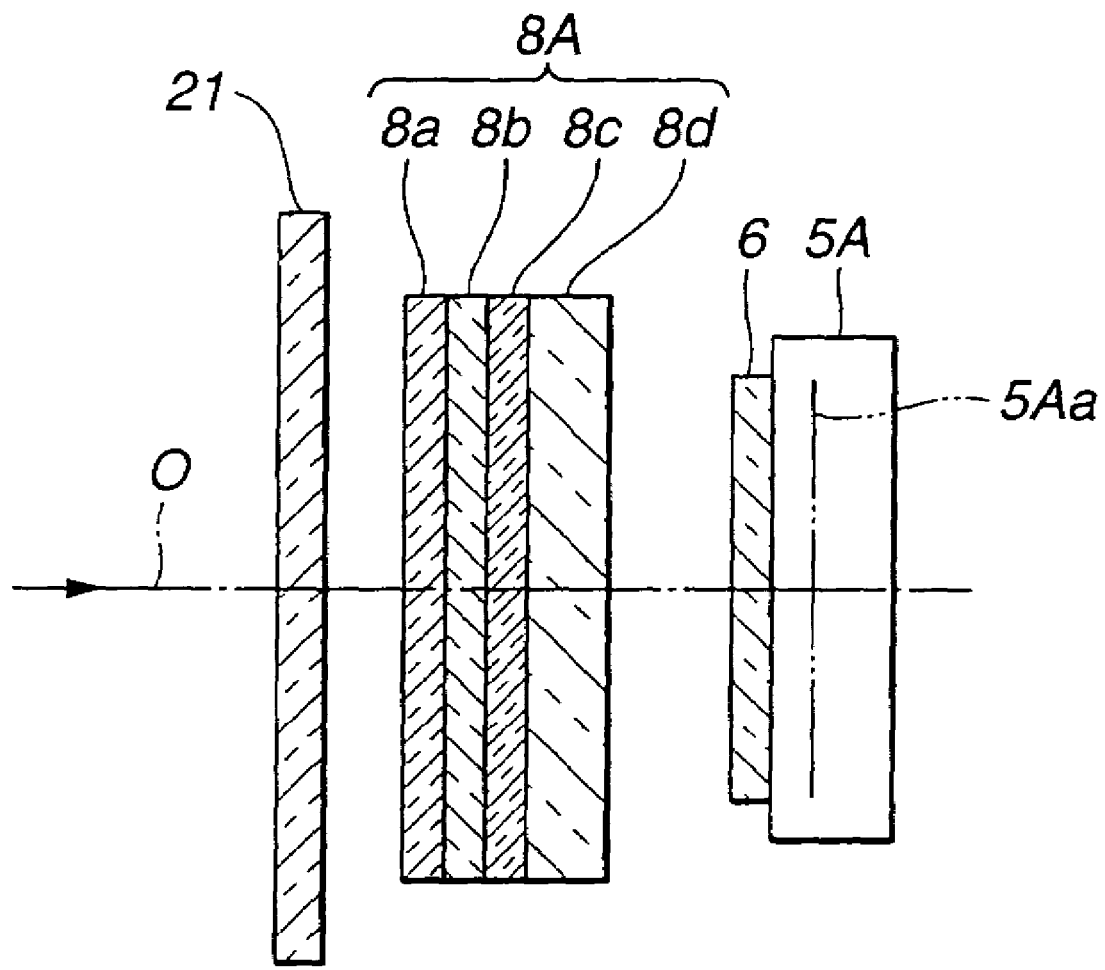
FIG. 4 is a schematic diagram showing details of an optical system of an image pickup unit to be applied to a first camera body of the digital camera in FIGS. 1A and 1B.
Figure 5:
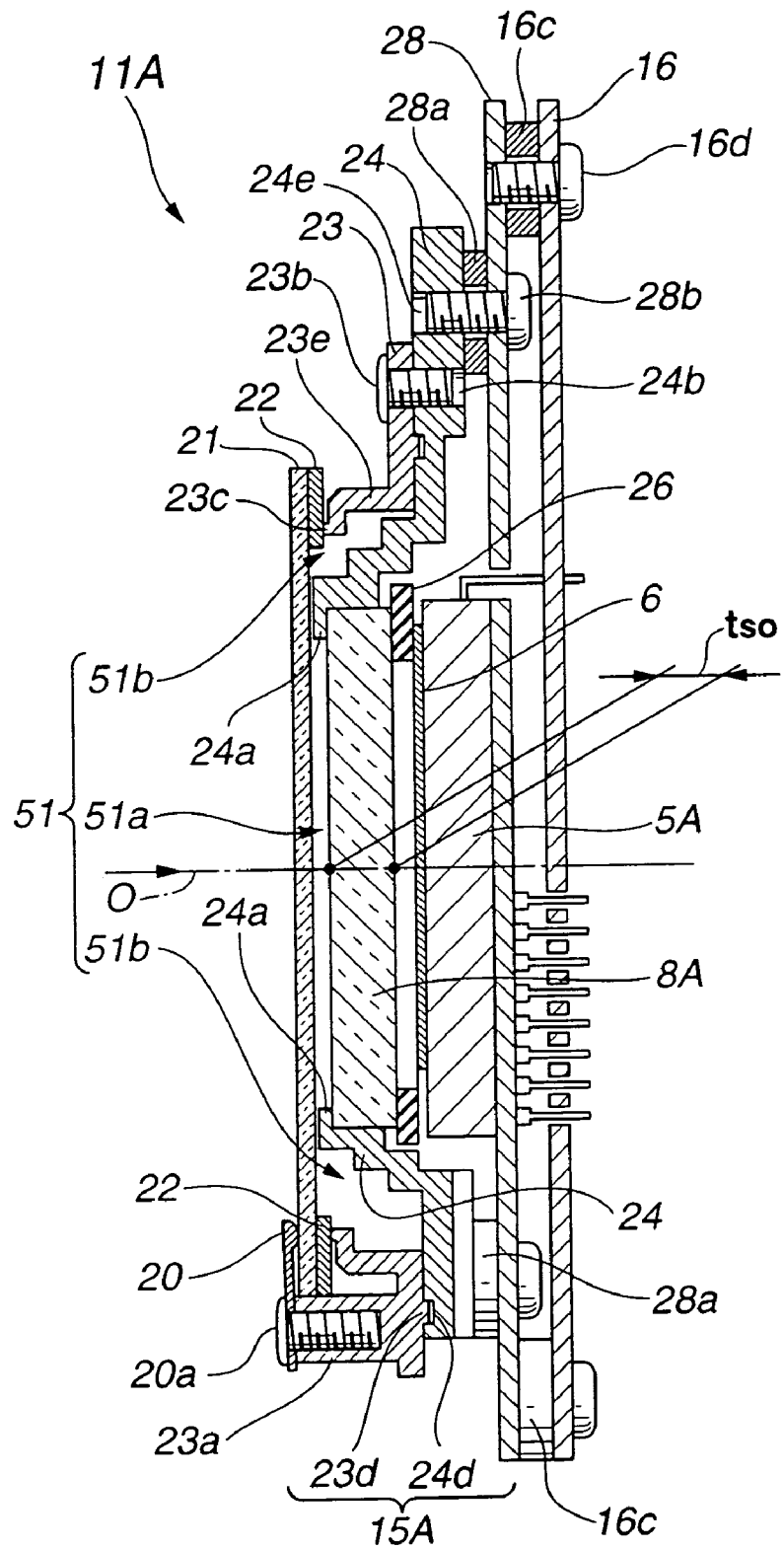
FIG. 5 is an enlarged vertical sectional diagram of the image pickup unit to be applied to the first camera body of the digital camera in FIGS. 1A and 1B.

FIG. 4 is a schematic diagram showing details of an optical system of the image pickup unit 15A in the first camera body 11A. FIG. 5 is an enlarged vertical sectional diagram of the image pickup unit 15A.

As shown in FIG. 4, the protective glass 6 is provided in the front of the surface of the image pickup element 5A. Furthermore, the optical LPF 8A and the dust-preventive filter 21 are disposed in front of the image pickup element 5A.

In the optical LPF 8A, a crystal plate 8a on the front side, an infrared absorbing glass 8b, a crystal plate 8c and a crystal plate 8d are superimposed. The double refraction direction of the crystal plate 8a is −45°. The double refraction direction of the crystal plate 8c is +45°. The double refraction direction of the crystal plate 8d is 0°.

Each of the crystal plates 8a and 8c has a thickness corresponding to the pixel pitch (about 7 μm) of the image pickup element 5A shown in FIG. 9, which will be described later. On the other hand, the crystal plate 8d has a thickness of the square route of the thickness of the crystal plates 8a and 8b. The optical LPF 8A having the above-described construction can prevent the moiré occurring when a subject luminous flux via the interchangeable lens barrel 12 forms an image on the photoelectric conversion surface 5Aa of the image pickup element 5A.

The crystal plates 8a, 8c, and 8d and the infrared absorbing glass 8b have refractive indexes close to that of glass and have a thickness ts0. The photoelectric conversion surface 5Aa of the image pickup element 5A is positioned at the image forming position of a subject luminous flux based on the effective light path length in accordance with the refractive index and the thickness ts0. Therefore, a subject luminous flux captured by the lens barrel 12 can form an image properly on the photoelectric conversion surface 5Aa of the image pickup element 5A without the curvature-of-field aberration. More strictly speaking, the thickness of the protection glass 6 and dust-preventive filter 21 also contributes to the change in effective optical path length. However, the protective glass 6 and the dust-preventive filter 21 have the same thickness in the first camera body and the second camera body. Therefore, the effective optical path length in accordance with the protective glass 6 and dust-preventive filter 21 do not differ between the first camera body and the second camera body.

On the other hand, when the protection glass 6 and the dust-preventive filter 21 have different thicknesses and/or materials between the first camera body and the second camera body, the curvature-of-field aberration is corrected by changing the thickness or the material of the compensating optical element in accordance with the change in the effective optical path length based on the differences.

FIG. 9 is a graph showing a relationship between pixel pitches of an image pickup element (a number of pixels of the image pickup element) and thickness of the corresponding optical LPF (in cases of a crystal plate and an LN element). As shown in FIG. 9, as the pixel pitch P decreases, the thickness of the corresponding optical LPF decreases. The thickness of the LN element in accordance with the same pixel pitch P is about 1/5 to 1/6 of that of the crystal plate.

Figure 6:
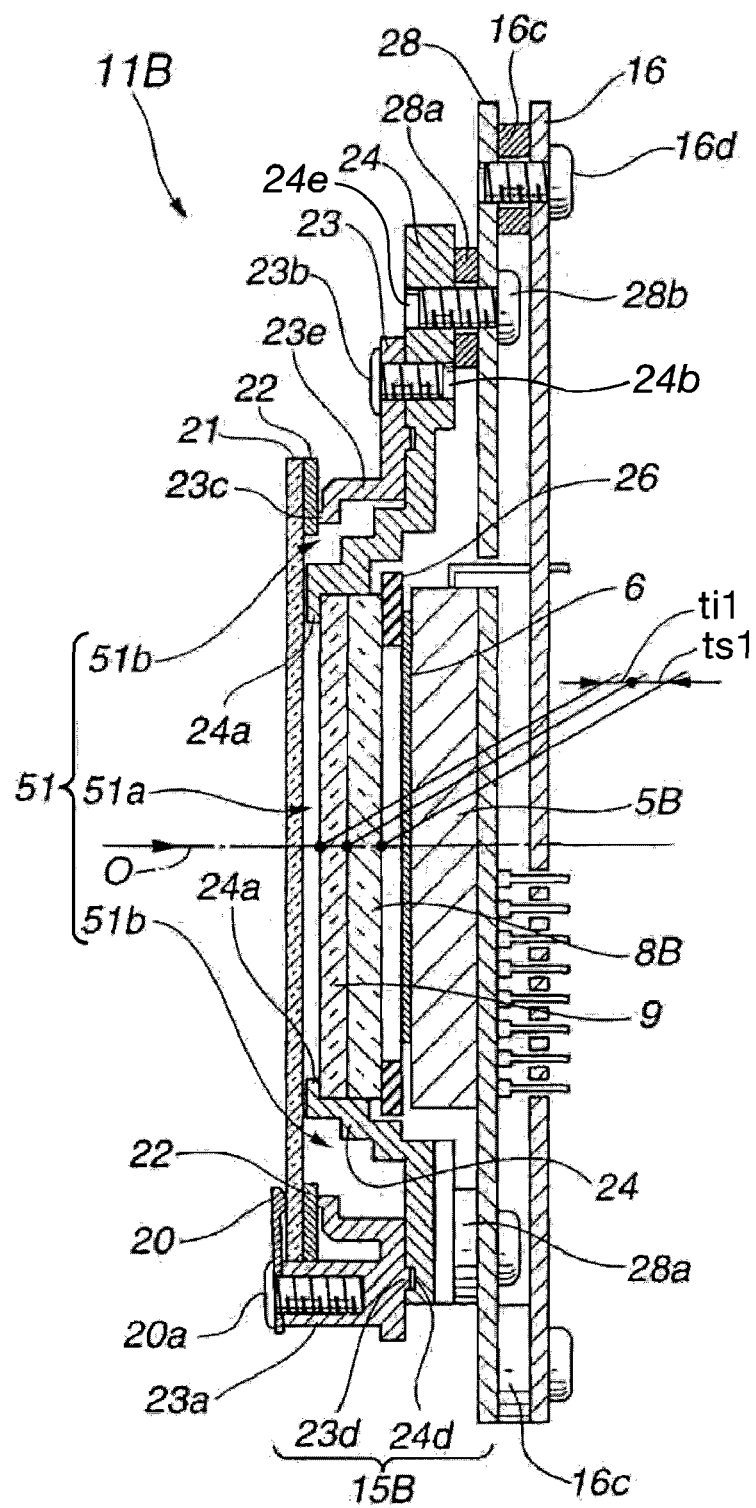
FIG. 6 is an enlarged vertical sectional diagram of an image pickup unit to be applied to a second camera body of the digital camera in FIGS. 1A and 1B.

On the other hand, the second camera body 11B has the image pickup element 5B of the image pickup unit 15B, the optical LPF 8B and the compensating optical element 9, which is a compensating optical system, instead of the image pickup element 5A and the optical LPF 8A in the first camera body 11A, as described above. The rest of the construction is the same. FIG. 6 is an enlarged vertical sectional diagram of the image pickup unit 15B in the second camera body 11B.

The size of the image pickup element 5B is 4/3 type, which is the same as that of the image pickup element 5A, and has a pixel pitch δ1, which is a second pixel pitch different from the reference pixel pitch δ0 (about 7 μm). The photoelectric conversion surface 5Ba (FIG. 1B) of the image pickup element 5B is spaced from the mount surface 3a by the same distance relatively between the mount surface 3a and the photoelectric conversion surface 5Aa (FIG. 1A) of the image pickup element 5A.

The optical LPF 8B has a thickness ts1 for a double refracting subject luminous flux in accordance with the pixel pitch δ1 of the image pickup element 5B (FIG. 6). The optical LPF 8B may be crystal or an LN element.

The compensating optical element 9 has a thickness ti1 for compensating an amount of change in effective optical path length due to the change of the optical LPF 8B into the thickness ts1 thinner than the thickness ts0 (FIG. 6). In other words, the compensating optical element 9 is an optical element, such as a glass plate having a refractive index substantially equal to that of crystal and not having a double refraction characteristic. The sum of the thickness ts1 of the optical LPF 8B and the thickness ti1 of the compensating optical element 9 is set equal to the thickness tS0 of the optical LPF 8A. The compensating optical element 9 is fixed to the optical LPF 8B with an optical adhesive.

Also in the image pickup unit 15B, a subject luminous flux captured through the interchangeable lens barrel 12 can form an image properly on the photoelectric conversion surface 5Ba of the image pickup element 5B without the curvature-of-field aberration and without the displacement of the image-forming position.

When the pixel pitch δ1 of the image pickup element 5B of the second camera body 11B is smaller than the reference image pitch δ0, which is 7 μm, that is, when the number of pixels of the image pickup element 5B is higher than the number of pixels of the image pickup element 5A, the thickness ts1 of the optical LPF 8B, which is a crystal plate, of the second camera body 11B is thinner than the thickness ts0 of the optical LPF 8A (FIG. 9). Here, the compensating optical element 9 is a glass plate having a thickness ti1 in accordance with the decreased amount of thickness for compensating the amount of change in effective optical path length due to the decrease in thickness of the optical LPF 8B. The compensating optical element 9 may be provided separately from the optical LPF 8B as shown in FIG. 6. However, for example, the same effect can be obtained by increasing the thickness of the infrared absorbing glass 8b, the protection glass 6 or the dust-preventive filter 21 by the amount of the thickness ti1.

On the other hand, when the pixel pitch δ1 of the image pickup element 5B of the second camera body 11B is larger than the reference image pitch δ0, 7 μm, that is, when the number of pixels of the image pickup element 5B is lower than the number of pixels of the image pickup element 5A, an LN element is applied as the optical LPF 8B so as not to further increase the thickness of the optical LPF. The thickness ts1 of the LN element extremely decreases as shown in FIG. 9 due to the double refraction characteristic in accordance with the increase in the pixel pitch. However, the thickness is 0.1 mm or larger and can be produced. Then, the compensating optical element 9 having the thickness ti1 equal to the amount of the decrease in thickness of the optical LPF 8B having an LN element is bonded to the optical LPF 8B (but, strictly speaking, the thickness ti1 of the compensating optical element 9 must be determined in consideration of the difference in refractive index between the LN element and the crystal). This allows a subject to form an image properly on the photoelectric conversion surface 5Ba (FIG. 1B) of the image pickup element 5B at the same position as that of the image pickup element 5A. The thickness of the optical LPF 8A of the first camera body 11A is the thickest in those of the optical LPFs in the other non-reference camera body such as the second camera body 11B.

As described above, when interchangeable lens barrels 12 are attached to the first camera body 11A and the second camera body 11B in a digital camera system according to this embodiment, the optical LPF 8A or 8B having different thickness (where the optical LPF 8B is thinner) is applied so as to double-refract a subject luminous flux in accordance with the pixel pitches. In this case, the first camera body 11A is a reference camera body containing the reference image pickup element 5A. The second camera body 11B contains the image pickup element 5B having a pixel pitch different from that of the first camera body 11A. In order to compensate the displacement of an image-forming position due to the decrease in thickness, the compensating optical element 9 is provided in the second camera body side. The provided compensating optical element 9 can allow the subject luminous flux properly to form an image on the photoelectric conversion surface of the image pickup element 5B without the curvature-of-field aberration.

The compensating optical element 9 of the second camera body 11B side has the amount of thickness equal to the decreased amount of thickness of the optical LPF 8B. Thus, the image pickup unit 15A of the first camera body 11A and the image pickup unit 15B of the second camera body 11B can take up the same spaces in the respective camera bodies. Therefore, the commonality of the constructions of the first and second camera bodies can be achieved easily.

The reference pixel pitch δ0 is 7 μm in this embodiment. A method for setting the reference pixel pitch will be described below.

As described above, the thickness of an optical low pass filter is determined based on the pixel pitch of an image pickup element. However, even with the same pixel pitch, the thickness of the optical low pass filter depends on the material. As shown in FIG. 9, the thickness significantly differs between the low pass filter containing crystal as a first material and the low pass filter applying an LN element as a second material. The number of pixels shown in FIG. 9 is for a 3/4 type image pickup element.

On the other hand, a thin optical low pass filter is preferably used for reducing the size of a camera. However, a much thinner optical low pass filter may be difficult to produce and may be easily destroyed, which is not preferable. An optical low pass filter containing an LN element for the image pickup element having the pixel pitch δ lower than about 6 μm is difficult to produce.

Therefore, a pixel pitch larger than the pixel pitch corresponding to the lowest thickness, which can be produced with the second material, an LN element, is set as the reference pixel pitch. Then, by forming the optical low-pass filter in accordance with the reference pixel pitch by using the first material, crystal, the optical low pass filter can have the lowest thickness even for the camera bodies having different pixel pitches.

Next, a digital camera system according to a second embodiment of the invention will be described with reference to FIGS. 7 and 8.

Figure 7:
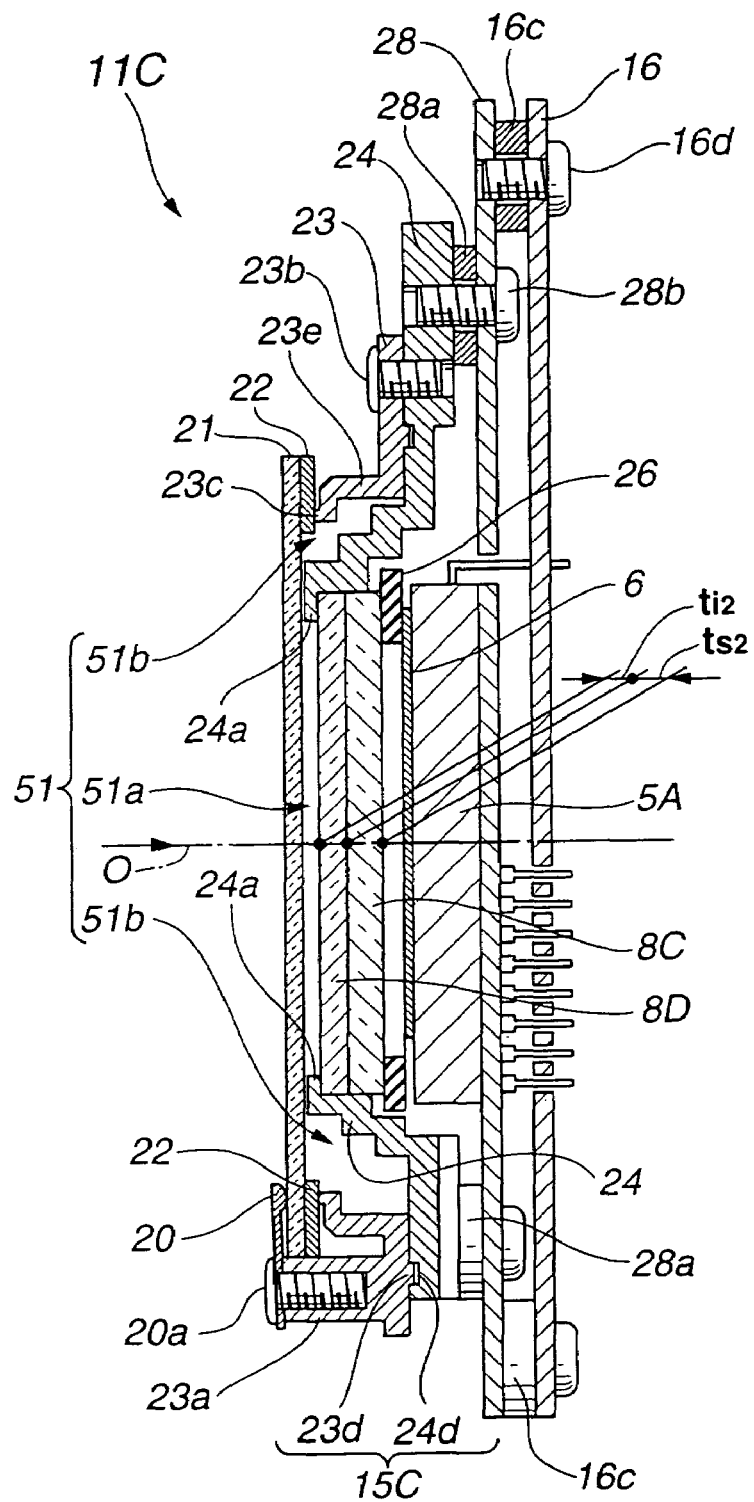
FIG. 7 is an enlarged sectional diagram of an image pickup unit to be applied to a first camera body in a digital camera system according to a second embodiment of the invention.
Figure 8:
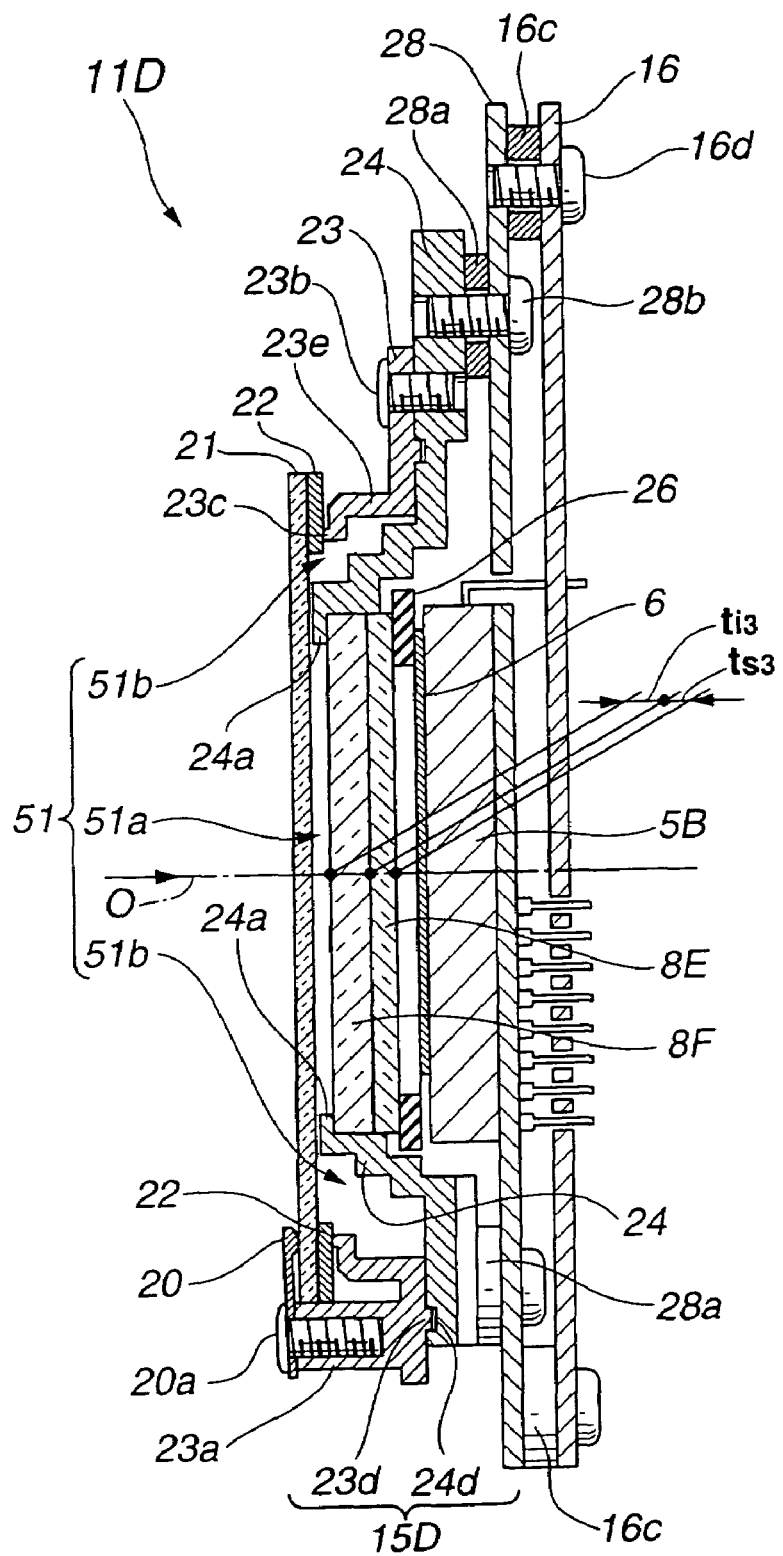
FIG. 8 is an enlarged vertical sectional diagram of an image pickup unit to be applied to a second camera body in the digital camera system according to the second embodiment in FIG. 7.

FIG. 7 is an enlarged vertical sectional diagram of an image pickup unit 15C in a first camera body in a digital camera system according to this embodiment. FIG. 8 is an enlarged vertical sectional diagram of an image pickup unit 15D in a second camera body in the digital camera system.

Like the first embodiment, the digital camera system according to this embodiment also includes: digital cameras. One digital camera which comprises an interchangeable lens barrel 12 in FIG. 2 having multiple interchangeable lenses and a first camera body 11C, which is a reference camera body; another digital camera which comprises an interchangeable lens barrel 12 and a second camera body 11D, which is a non-reference camera body, and an interchangeable lens barrels 12 having the same specification to be removably attached to the first camera body 11C and the second camera body 11D, respectively.

The first camera body 11C has the same construction as that of the first camera body 11A except for the contained optical LPF 8A of the image pickup unit 15A. The second camera body 11D has the same construction as that of the second camera body 11B except for the optical LPF 8B and the compensating optical element 9 in the image pickup unit contained in the second camera body 11B. Therefore, the same reference numerals are given to the same components, and only the different parts will be described below.

An image pickup unit 15C of the first camera body 11C contains an image pickup element 5A having a reference pixel pitch δ0 (about 7 μm). An optical LPF 8C and an infrared cut filter (infrared absorbing glass) 8D are provided on the front surface side.

The optical LPF 8C is constituted by a crystal plate having the same double refraction characteristic as that of the optical LPF 8A. The thickness ts2 is set in accordance with the reference pixel δ0 of the image pickup element 5A in order to prevent the occurrence of moiré (FIG. 9). The optical LPF 8C is the thickest in optical LPFs built in the non reference camera bodies such as the second camera body 11D.

The infrared cut filter 8D has the same refractive index as that of crystal but does not have a double refraction characteristic. The infrared cut filter 8D is set to have a thickness ti2 enough to absorb infrared rays.

A subject luminous flux captured through the attached interchangeable lens barrel 12 forms an image on the photoelectric conversion surface 5Aa (FIG. 1A) of the image pickup element 5A through the dust-preventive glass 21, the infrared cut filter 8D, the optical LPF 8C and the protective glass 6. The photoelectric conversion surface 5Aa is positioned at the position where the curvature-of-field aberration does not occur in consideration of an amount of the change in effective optical path length based on the refractive index of the optical LPF 8C.

On the other hand, the image pickup unit 15D of the second camera body 11D contains an image pickup element 5B having a pixel pitch δ1 different from the reference pixel pitch δ0. An optical LPF 8E and an infrared cut filter (infrared absorbing glass) 8F also used as a compensating optical system are provided on the front surface side. An photoelectric conversion surface 5Ba of the image pickup element 5B is disposed at the same position as that of the photoelectric conversion surface 5Aa of the image pickup element 5A.

The optical LPF 8E has the same double refraction characteristic as that of the optical LPF 8C and includes a crystal plate or an LN element. The thickness ts3 is set thinner than the thickness ts2 in accordance with the pixel pitch δ1 of the image pickup element 5B in order to prevent the occurrence of moiré.

The infrared cut filter 8F has the same refractive index as that of crystal but does not have a double refraction characteristic. The infrared cut filter 8F has a thickness ti3 enough for absorbing infrared rays and for compensating an amount of the decrease in thickness of the optical LPF 8E. In other words, the thickness of the infrared cut filter 8D is increased by an amount of the difference in thickness between the optical LPF 8E and the optical LPF 8C. The sum ti3+ts3 of thickness of the infrared cut filter 8F and the optical LPF 8E is set substantially equal to the sum ti2+ts2 of thickness of the infrared cut filter 8D and the optical LPF 8C. Therefore, a subject luminous flux captured through the interchangeable lens barrel 12 can form an image properly on the photoelectric conversion surface 5Ba (FIG. 1B) of the image pickup element 5B through the dust-preventive glass 21, the infrared cut filter 8F, the optical LPF 8E and the protection glass 6 in the second camera body 11D without the occurrence of the curvature-of-field aberration.

When the pixel pitch δ1 of the image pickup element 5B applied to the second camera body 11D is smaller than the reference pixel pitch δ0, the thickness ts3 of the optical LPF 8E is thinner while the thickness ti3 of the infrared cut filter 8 is increased by the amount of the decrease in the thickness ts3 like the first embodiment. When the pixel pitch δ1 of the image pickup element 5B applied in the second camera body 11D is larger than the reference pixel pitch δ0, a thinner LN element is applied as the optical LPF 8E like the first embodiment. The thickness ts3 is thin but still can be produced (0.1 mm or larger). The thickness ti3 of the infrared cut filter 8F is increased by the amount of the decrease in the thickness ts3 (where, strictly speaking, the thickness ti3 of the infrared cut filter 8F must be determined in consideration of the difference in refractive index between an LN element and crystal). Therefore, the sum of the thickness of the infrared cut filter 8F and the optical LPF 8E does not change substantially, and the image pickup unit 15C and the image pickup unit 15D take up the same amount of space. The thickness of the optical LPF 8C of the first camera body 11C is the thickest in the optical LPFs built in the other non-reference camera bodies such as the second camera body 11D.

As described above, the same effects can be obtained as those of the first embodiment even in a digital camera system according to this embodiment. The interchangeable lens barrel 12 having the same specification can be removably attached to the first camera body 11C on the reference side and the second camera body 11D on the non-reference side. Subject luminous fluxes of both of them can form an image on the photoelectric conversion surface of the image pickup element at the same position without the curvature-of-field aberration.

According to this embodiment, the image pickup units 15C and 15D take up the same amount of space within the camera bodies according to this embodiment. Therefore, the other components in the first camera body 11C and the second camera body 11D can be arranged under the same condition.

In a lens-interchangeable digital camera system according to the invention, interchangeable lenses having the same specification can be removably attached to different camera bodies including image pickup element having different pixel pitches from each other. Thus, images without the curvature-of-field aberration can be picked up by the digital cameras, respectively. Furthermore, components relating to the image pickup elements can be arranged in different camera bodies in a same manner.

The invention is not limited to the above-described embodiments, and various changes are possible without departing from the principle. Furthermore, the embodiments include the invention at various stages, and various inventions can be extracted by properly combining multiple disclosed constructional requirements.

For example, even when several constructional requirements are removed from the entire constructional requirements described in the embodiments, the construction from which the constructional requirements are removed can be extracted as an invention if the problems described in the section, Problems to be Solved by the Invention, can be solved.

What is claimed is:

1. A lens-interchangeable digital camera system, comprising:
   a first camera body including a first image pickup element having a pixel pitch of about 7 μm and a first optical low pass filter having a thickness determined based on the pixel pitch of about 7 μm;
   an interchangeable lens removably attached to the first camera body and having a function for correcting a curvature-of-field aberration on an image-forming surface of the image pickup element; and
   a second camera body including a second image pickup element to which the interchangeable lens can be removably attached, having a pixel pitch different from the pixel pitch of about 7 μm and a greater number of pixels than that of the first image pickup element, a second optical low pass filter having a thickness determined in accordance with the pixel pitch of the second image pickup element and being thinner than the first optical low pass filter, and a compensating optical system for correcting a difference in optical path length caused due to the difference in thickness of the first optical low pass filter and second optical low pass filter.

2. The lens-interchangeable digital camera system according to claim 1, wherein the first and second optical low pass filters are optical elements having a double refraction characteristic, and the compensating optical system does not have a double refraction characteristic.

3. The lens-interchangeable digital camera system according to claim 2, wherein the first and second optical low pass filters are constituted by crystal.

4. The lens-interchangeable digital camera system according to claim 1, wherein the refractive index of the compensating optical system is substantially equal to that of crystal.

5. The lens-interchangeable digital camera system according to claim 1, wherein the sum of the thickness of the second optical low pass filter and the thickness of the compensating optical system is substantially equal to the thickness of the first optical low pass filter.

6. A lens-interchangeable digital camera system, comprising:
   a first camera body including a first image pickup element having a first pixel pitch and a first optical low pass filter having a thickness determined in accordance with the first pixel pitch of the first image pickup element;
   an interchangeable lens attachable to the first camera body, having a correction function for optimizing the curvature-of-field aberration on an image-forming surface of the first image pickup element when the interchangeable lens is attached to the first camera body; and
   a second camera body to which the interchangeable lens can be attached, including, as a part of the second camera body, a second image pickup element having a second pixel pitch different from the first pixel pitch, a second optical low pass filter having a thickness determined in accordance with the second pixel pitch and being thinner than the first optical low pass filter, and a compensating optical system fixed to the second optical low pass filter, wherein adjacent surfaces of the second optical low pass filter and the compensating optical system are in engagement, for correcting the curvature-of-field aberration on the image-forming surface of the second image pickup element caused due to the difference in thickness of the first optical low pass filter and the second optical low pass filter.

7. The lens-interchangeable digital camera system according to claim 6, wherein the first pixel pitch is about 7 μm.

8. The lens-interchangeable digital camera system according to claim 6, wherein the second pixel pitch is narrower than the first pixel pitch.

9. The lens-interchangeable digital camera system according to claim 6, the second image pickup element has a greater number of pixels than that of the first image pickup element.

10. A lens-interchangeable digital camera system, comprising:
    an interchangeable lens for which optical aberration is corrected so as to be compliant with a reference camera body; and
    a camera body to which the interchangeable lens can be attached, having, as part of the camera body, an image pickup element, an optical element within a photographic optical path of the image pickup element, and a compensating optical element provided within the photographic optical path together with the optical element in order to correct aberration due to the combination of the interchangeable lens and the optical element, wherein the compensating optical element is fixed to the optical element and adjacent surfaces of the optical element and the compensating optical element are in engagement.

11. The lens-interchangeable digital camera system according to claim 10, wherein the interchangeable lens is designed so as to minimize the curvature-of-field aberration in combination with the reference camera body.

12. A lens-interchangeable digital camera system, comprising:
    a first camera body including a first optical low pass filter;
    an interchangeable lens compliant with the first camera body and set such that an optical characteristic can correct aberration due to the first optical low pass filter; and
    a second camera body to which the interchangeable lens can be attached, including, as part of the second camera body, a second optical low pass filter thinner than the first optical low pass filter and a compensating optical system fixed to the second optical low pass filter, wherein adjacent surfaces of the second optical low pass filter and the compensating optical system are in engagement, for correcting for the difference in thickness of the first optical low pass filter and the second optical low pass filter.

13. A lens-interchangeable digital camera system according to claim 12, wherein the first and second optical low pass filters are optical elements having a double refraction characteristic, and the compensating optical system is an optical element having no double refraction characteristic.

14. A camera body to which an interchangeable lens for correcting aberration to fit to a reference camera body can be attached, comprising:

an image pickup element having a different pixel pitch from that of the image pickup element in the reference camera body;

an optical low pass filter provided in a photographic optical path and having a thickness in accordance with the pixel pitch of the image pickup element; and a compensating optical system for correcting aberration due to the combination of the interchangeable lens and the optical low pass filter, wherein the compensating optical system is fixed to the optical low pass filter and adjacent surfaces of the optical low pass filter and the compensating optical system are in engagement.

15. An interchangeable lens removably attached to multiple camera bodies, the interchangeable lens comprising:

a lens side mount portion for engaging with a mount portion of the camera body;

a photographic optical system for optimizing aberration on the image pickup surface for a thickest optical low pass filter in the multiple camera bodies;

wherein the curvature-of-field aberration on the image pickup surface is minimized for a camera body having the thickest optical low pass filter; and wherein the thickest optical low pass filter has a thickness corresponding to an image pickup element having a pixel pitch of about 7 μm.

16. The interchangeable lens according to claim 15, wherein the thickest optical low pass filter contains crystal.

17. A given camera body to which an interchangeable lens optically designed for a reference camera body can be removably attached, comprising:

an interchangeable lens mount portion;

an image pickup element;

a compensating optical system provided between the mount portion and the image pickup element such that an optical length between the interchangeable lens mount portion and the image pickup element is equal to that of the reference camera body; and wherein the compensating optical system has a refractive index substantially equal to that of crystal.

18. The given camera body according to claim 17, wherein the given camera body has an optical low pass filter between the interchangeable lens mount portion and an image pickup surface of the image pickup element, and the compensating optical system compensates a difference in optical path length between an optical low pass filter in the reference camera body and the optical low pass filter in the given camera body.

19. The given camera body according to claim 18, wherein the compensating optical system has substantially the same thickness as the difference in thickness between the optical low pass filter in the reference camera body and an optical low pass filter in the given camera body.

20. The given camera body according to claim 18, wherein the optical low pass filter in the given camera body has a thickness different from that of an optical low pass filter in the reference camera body.

21. The given camera body according to claim 20, wherein the optical low pass filter in the given camera body is thinner than an optical low pass filter in the reference camera body.

22. A reference camera body, comprising:

an interchangeable lens mount portion for attaching an interchangeable lens;

an image pickup element; and an optical low pass filter between the interchangeable lens mount portion and an image pickup surface of the image pickup element, wherein the reference camera body is one of multiple camera bodies to which an interchangeable lens can be attached and is a reference for the interchangeable lens, and an aberration on an image pickup surface of the image pickup element is optimized by a combination of the optical low pass filter and the interchangeable lens; and wherein a thickness of the optical low pass filter is determined in accordance with the image pickup element having a pixel pitch of about 7 μm.

23. The reference camera body according to claim 22, wherein the optical low pass filter is crystal.

24. A lens-interchangeable digital camera system, comprising:

a first camera body including a first optical element having a predetermined function;

an interchangeable lens compliant with the first camera body, having an optical characteristic designed for correcting aberration for the first camera body; and a second camera body to which the interchangeable lens can be attached, having, as part of the second camera body:

a second optical element which has the same function as that of the first optical element and which is thinner than the first optical element; and a compensating optical system fixed to the second optical element, wherein adjacent surfaces of the second optical element and the compensating optical system are in engagement, for correcting optical path length due to a difference in thickness between the first optical element and the second optical element.

* * * * *